(12) United States Patent
Geukes et al.

(10) Patent No.: US 9,727,754 B2
(45) Date of Patent: *Aug. 8, 2017

(54) PROTECTING CHIP SETTINGS USING SECURED SCAN CHAINS

(71) Applicant: International Business Machines Corporation, Armonk, NY (US)

(72) Inventors: Benedikt Geukes, Stuttgart (DE); Bodo Hoppe, Tamm (DE); Matteo Michel, Chemnitz (DE); Juergen Wakunda, Ilsfeld (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/944,885

(22) Filed: Nov. 18, 2015

(65) Prior Publication Data

US 2016/0070933 A1    Mar. 10, 2016

Related U.S. Application Data

(63) Continuation of application No. 13/355,265, filed on Jan. 20, 2012, now Pat. No. 9,222,973.

(30) Foreign Application Priority Data

Jan. 20, 2011  (EP) ..................................... 11151489

(51) Int. Cl.
*G06F 21/00*     (2013.01)
*G06F 21/72*     (2013.01)
(Continued)

(52) U.S. Cl.
CPC ......... *G06F 21/72* (2013.01); *G01R 31/3177* (2013.01); *G01R 31/31719* (2013.01); *G01R 31/318588* (2013.01); *G06F 21/76* (2013.01)

(58) Field of Classification Search
CPC combination set(s) only.
See application file for complete search history.

(56) References Cited

U.S. PATENT DOCUMENTS 4,293,919 A    10/1981  Dasgupta et al.
5,517,637 A     5/1996  Bruce, Jr. et al.
(Continued)

OTHER PUBLICATIONS

Mukhopadhyay, et al., "CryptoScan: A Secured Scan Chain Architecture", Proceedings of the 14th Asian Test Symposium (ATS '05) 1081-7735/05, 2005, 6 pages.
(Continued)

*Primary Examiner* — Ghazal Shehni
(74) *Attorney, Agent, or Firm* — DeLizio Law, PLLC (57) ABSTRACT

Some embodiments include a method for processing a scan chain in an integrated circuit, the method comprising receiving, in the integrated circuit, the scan chain, wherein the scan chain includes a secret key pattern; separating the secret key pattern from the scan chain; storing the scan chain in a first plurality of latches; storing the secret key pattern in a second plurality of latches; comparing the secret key pattern to a reference key pattern, the reference key pattern stored in a third plurality of latches; determining, based on the comparing the secret key pattern to the reference key pattern, that the secret key pattern does not match the reference key pattern; and generating a signal indicating that the secret key pattern does not match the reference key pattern.

20 Claims, 6 Drawing Sheets

(51) Int. Cl.
*G01R 31/317* (2006.01)
*G01R 31/3185* (2006.01)
*G01R 31/3177* (2006.01)
*G06F 21/76* (2013.01)

(56) References Cited

U.S. PATENT DOCUMENTS

| | | | |
|---|---|---|---|
| 5,732,209 A * | 3/1998 | Vigil | G01R 31/318566 714/30 |
| 6,012,155 A | 1/2000 | Beausang et al. | |
| 6,671,839 B1 * | 12/2003 | Cote | G01R 31/318566 324/73.1 |
| 7,308,656 B1 | 12/2007 | Roberts et al. | |
| 7,536,619 B2 | 5/2009 | Satsukawa et al. | |
| 7,590,905 B2 | 9/2009 | Abdel-Hafez et al. | |
| 7,600,166 B1 | 10/2009 | Dunn et al. | |
| 7,685,327 B1 | 3/2010 | Jacobson et al. | |
| 7,865,792 B2 | 1/2011 | Lin et al. | |
| 7,945,830 B2 | 5/2011 | Wang et al. | |
| 7,962,885 B2 | 6/2011 | Chakraborty et al. | |
| 8,732,209 B2 | 5/2014 | Griffin et al. | |
| 2009/0013226 A1 | 1/2009 | Swoboda et al. | |
| 2010/0264932 A1 * | 10/2010 | Marinissen | G01R 31/31719 324/537 |
| 2012/0191403 A1 | 7/2012 | Guekes et al. | |
| 2013/0139014 A1 | 5/2013 | Geukes et al. | |

OTHER PUBLICATIONS

"IEEE Standard Test Access Port and Boundary-Scan Architecture", IEEE standard 1149.1a(IEEE standard 1149.1-1990 revision), Mar. 27, 2008, 208 pages.
"U.S. Appl. No. 13/305,498 Office Action", Apr. 29, 2013, 10 pages.
"U.S. Appl. No. 13/305,498 Office Action", Dec. 31, 2012, 13 pages.
"U.S. Appl. No. 13/355,265 Final Office Action", May 26, 2015, 9 pages.
"U.S. Appl. No. 13/355,265 Office Action", Nov. 19, 2014, 11 pages.
Hély, et al., "Scan Design and Secure Chip", On-Line Testing Symposium, 2004. IOLTS 2004. Proceedings. 10th IEEE International, Jul. 2004, pp. 219-224.
Lee, et al., "Securing Scan Design Using Lock & Key Technique", 20th IEEE International Symposium on Defect and Fault Tolerance in VLSI Systems IEEE, 2005, 9 pages.

* cited by examiner

PROTECTING CHIP SETTINGS USING SECURED SCAN CHAINS

RELATED APPLICATIONS

This application is a continuation application that claims priority benefit of U.S. application Ser. No. 13/355,265 filed Jan. 20, 2012 which claims priority under 35 U.S.C. 119 from European Patent Application No. EP11151489 filed Jan.20, 2011.

BACKGROUND

Embodiments of the inventive subject matter relate to the field of integrated circuits, and more particularly to methods for processing scan chains in integrated circuit.

Some integrated circuit (IC) technologies use scan-based design methodologies and techniques to facilitate design, testing, and diagnostics. In scan designs, especially full scan designs, sequential circuits are converted into combinational circuits via scannable latches or flip-flops during testing or for configuration purposes (e.g., for temperature sensor calibration data). Using a scan-based design, structural testing may be more controllable and observable. Another aspect of using scan designs is that the test cost is less than functional testing, especially for submicron designs. Scan-based design can also be used to provide separate means to access logic in the functional data path of an IC.

For example, boundary scan is a method for testing interconnects (wire lines) on printed circuit boards or sub-blocks inside an integrated circuit. Boundary scan is also widely used as a debugging method to watch integrated circuit pin states, measure voltage, or analyze sub-blocks inside an integrated circuit. In the 1980s, the Joint Test Action Group (JTAG) developed a specification for boundary-scan testing that was standardized in 1990 as the IEEE standard 1149.1-1990. In 1993 a new revision titled 1149.1a was introduced. Another approach is the IBM LSSD (Level-Sensitive Scan Design) boundary scan methodology.

The boundary-scan test architecture adds a boundary-scan cell that includes a multiplexer and latches to each pin on the device. Boundary-scan cells in a device can capture data from pin or core logic signals, or force data onto pins. Captured data is serially shifted out and externally compared to the expected results. Forced test data is serially shifted into the boundary-scan cells. All of this is controlled from a serial data path called the scan path or scan chain. For normal operation, the added boundary scan latch cells are set so that they have no effect on the circuit, and are therefore effectively invisible. However, when the circuit is set into a test mode, the latches enable a data stream to be shifted from one latch into the next. Once a complete data word has been shifted into the circuit under test, it can be latched into place so it drives external signals. Shifting the word also generally returns the input values from the signals configured as inputs.

In many server computer systems, scan chains are also used to initialize and monitor all system latches of chips, such as processors during functional and test modes. However, after all chips are initialized and working correctly, system latches can be changed to improper settings via scan chains, such as by applying scan chains accidentally or by incorrect settings in a scan chain. In some cases, configuration settings are manipulated in order to circumvent security mechanisms. The following chip settings should be protected from such unintended changes in order to avoid system malfunctions and damages:

mode settings (to enable/disable certain units/chiplets on a chip);
fence settings (to hide access to certain areas on chip);
clock/PLL (Phase-Locked Loop) settings (to allow only change of clock ratios/PLL settings for certified persons).

SUMMARY

Some embodiments include a method for processing a scan chain in an integrated circuit. The method can include: receiving, in the integrated circuit, the scan chain, wherein the scan chain includes a secret key pattern; separating the secret key pattern from the scan chain; comparing the secret key pattern to a reference key pattern; determining, based on the comparing the secret key pattern to the reference key pattern, that the secret key pattern does not match the reference key pattern; and generating a signal indicating that the secret key pattern does not match the reference key pattern.

Some embodiments include a compare circuit for processing a scan chain in an integrated circuit. The compare circuit can include a multiplexer configured to extract key data from the scan chain, wherein the scan chain includes information resulting from a boundary scan of the integrated circuit. The compare circuit can also include a comparator configured to receive the key data and to determine if the key data matches a reference key data; and a signaling component configured to generate a pass signal if the key data matches the reference key data, and to generate a fail signal if the key data does not match the reference key data. The compare circuit can also include a memory device configured to store a copy of the scan chain, and to allow access to the copy of the scan chain after generation of the pass signal.

Some embodiments include a method for processing a scan chain in an integrated circuit. The method can include receiving, in the integrated circuit, the scan chain, wherein the scan chain includes a secret key pattern, wherein the secret key pattern includes a read key and a write key. The method can also include separating the read key and write key from the scan chain. The method can also include comparing the read key to a read key reference pattern, and comparing the write key to a reference write reference key pattern. The method can also include determining that the read key matches the read key reference pattern and that the write key matches the write key reference pattern, and generating a read signal and a write signal, wherein the read signal enables reading of the scan chain, and the write signal enables writing to the scan chain.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In some instances, for clarity, well-known instruction instances, protocols, structures and techniques may not been shown in detail.

Figure 1:
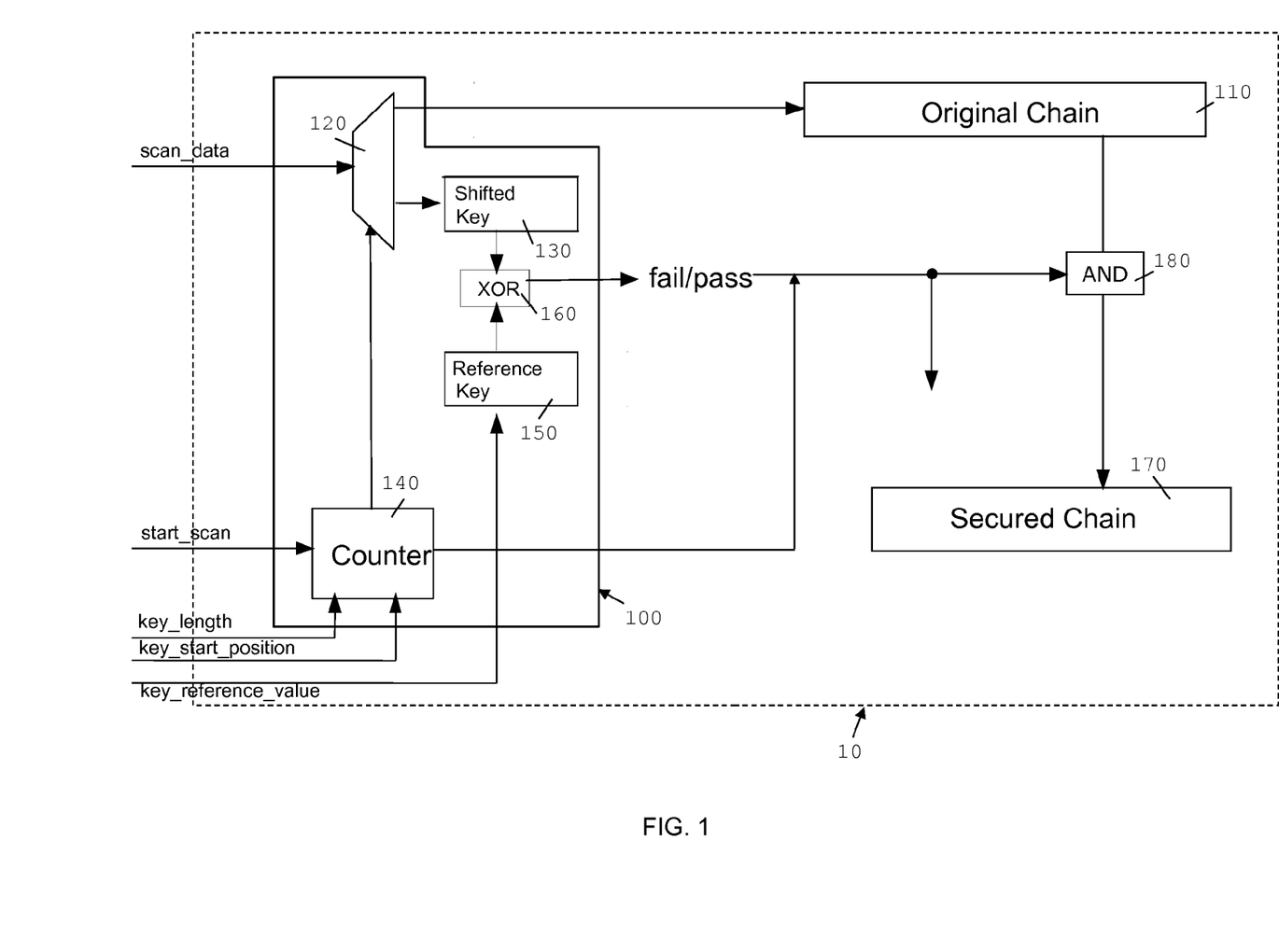
FIGS. 1, 2, and 6 are schematic block diagrams illustrating integrated circuits with compare circuits, in accordance with some embodiments of the inventive subject matter.

FIG. 1 illustrates a compare circuit 100 in an integrated circuit 10, which stores an original scan chain in latches 110. The compare circuit 100 receives the original scan chain via an input line scan_data that is connected to an extraction circuit 120. The compare circuit 100 may be used in any suitable integrated circuit.

Referring to FIG. 1, in some embodiments, the extraction circuit 120 stores the original scan chain in the latches 110. In addition to the scan chain, the extraction circuit 120 extracts key data from the input data provided on the scan_data input line and stores it in latches 130. The extraction circuit 120 uses an extraction signal provided by a counter circuit 140, which is connected to the extraction circuit 120. When the extraction signal is on, the extraction circuit stores the data currently processed in the latches 130. Otherwise the data is stored in the latches 110.

The counter circuit 140 is connected to input signal lines start_scan, key_length and key start_position of the compare circuit 100. In a very simple implementation of the compare circuit 100, eFUSEs can be used, which are programmed with the numbers provided via the input signal lines before the start_scan signal goes on. eFUSE technology is described in R.F. Rizzolo et al. "IBM z9 eFUSE applications and methodology", IBM Journal of Research and Development, Vol. 51, Jan. 2007, pp. 65-75. When start_scan goes on, then the counter circuit starts to count from zero with every clock cycle. When the counting reaches the number provided via the key start_position signal lines, then the counter circuit 140 turns on the extraction signal for the number of subsequent clock cycles provided via the key_length signal lines.

The compare circuit 100 also includes latches 150, which are used to store a reference key that is received via input signal lines key_reference_value before the start_scan signal goes on. The reference key stored in latches 150 is compared via an XOR circuit 160 with the shifted key from the scan chain, which is stored in latches 130. Instead of storing the reference key directly in the latches 150, some embodiments can use eFUSEs to intermediately store the reference key before storing it in the latches 150 for the comparison with the shifted key. However, in such embodiments, the latches 150 must be non-scannable and non-changeable (i.e., there should not be any means for changing the latches 150).

As a result of the comparison, a fail/pass_output signal is turned on or off by the XOR circuit 160, which can be used together with an appropriate output signal from the counter circuit 140 to trigger destructive actions, force resets, locking or unlocking the chip comprising the compare circuit 100 or of units of the chip, or to copy the original scan chain from the latches 110 to the latches 170 in order to retrieve a secured scan chain. In the latter case, an AND circuit 180 is used to gate the signals between the latches 110 and 170. For example, the copying from latches 110 to the latches 170 can also be performed by shifting the scan chain data. The secured scan chain can then be used to perform the scan chain actions.

In the embodiments using eFUSE programming, the scan process can be implemented such that it is transparent from outside the chip containing the compare circuit 100. But this requires that the key is generated in advance. The key can be generated automatically by a computer program on a separate computer system. Then, the key can be programmed as a compare value in eFUSEs during the manufacturing process of the chip containing a compare circuit 100. This way a "hard coded" compare value is written into the chip.

The key length should be chosen depending on security requirements. For example, a length of 64 bit can be chosen for low security requirements, a length of 128 bit can be chosen for medium security requirements, and a length of 10% of the scan chain bits can be used for high security requirements (assuming a substantial scan chain length). The key and its position in the scan chain can be assigned during manufacturing of the integrated circuit.

Figure 2:
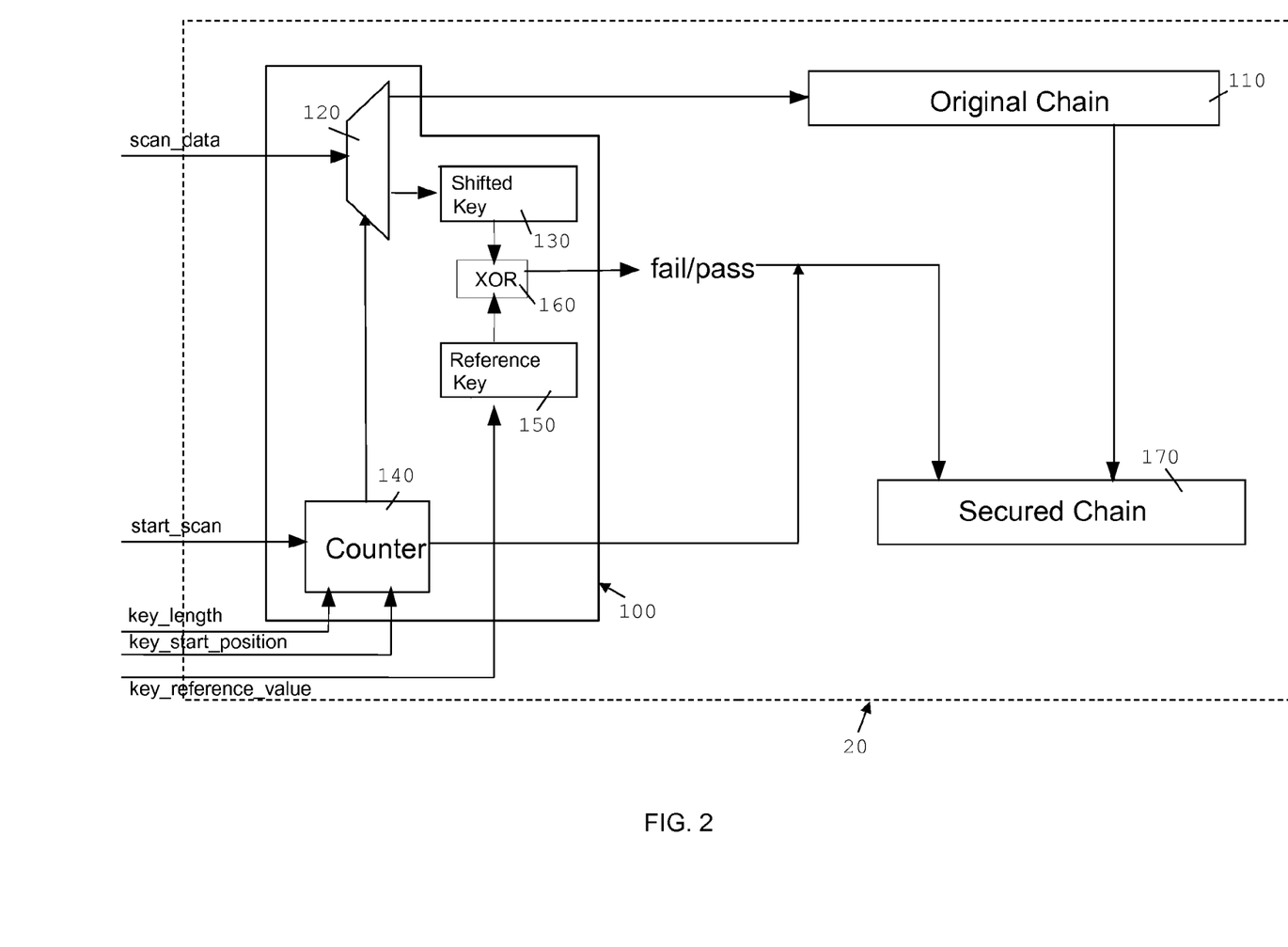

The integrated circuit 20 shown in FIG. 2 uses the same compare circuit 100. However, here the fail/pass_output signal delivered by the compare circuit 100 is used as a clock signal for the latches 170 in the process of copying the content of the latches 110.

Figure 3:
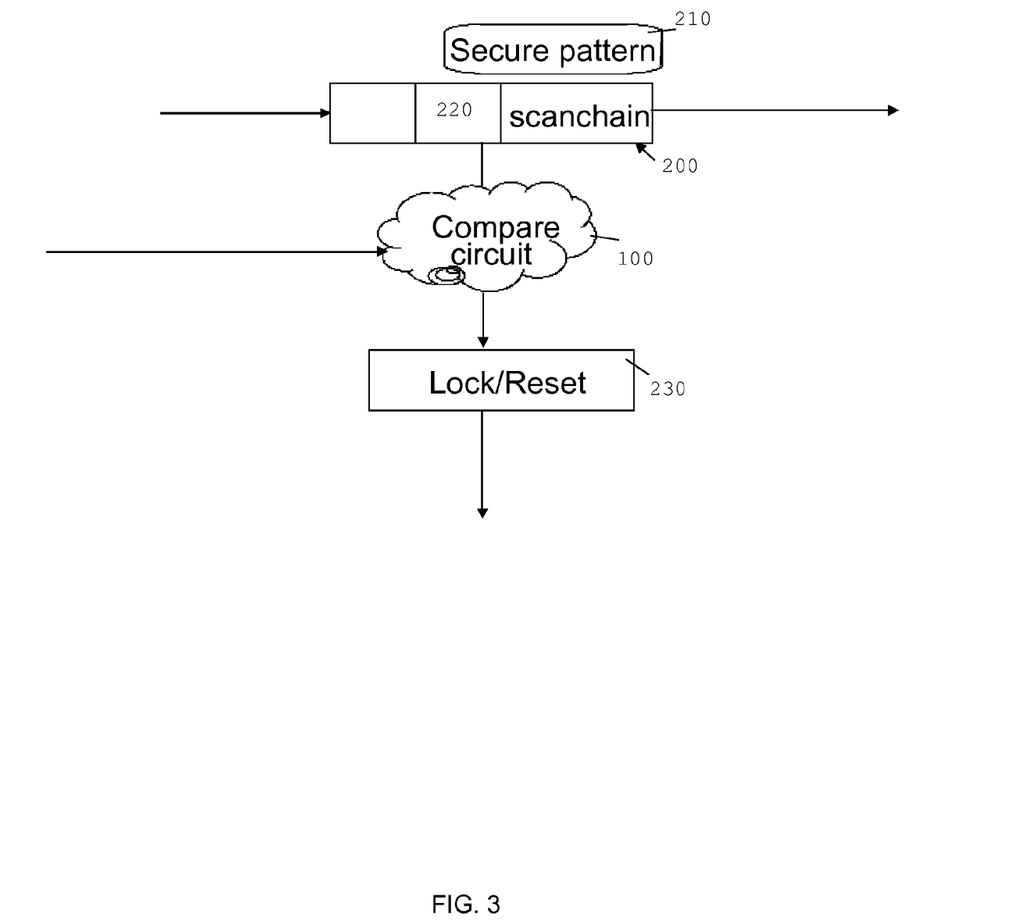
FIGS. 3, 4, and 5 are schematic block diagrams illustrating scanning processes, in accordance with some embodiments of the inventive subject matter.

Referring to FIG. 3, in some embodiments, the compare circuit 100 processes a scan chain 200, where a secure pattern 210 is used as reference key. As the scan chain 200 does not contain the secure pattern 210 in the required area 220, the compare circuit 100 signals a failed comparison to a lock/reset circuit 230, which then puts the chip into a reset or a lock state, preventing use of the scan chain 200.

Figure 4:
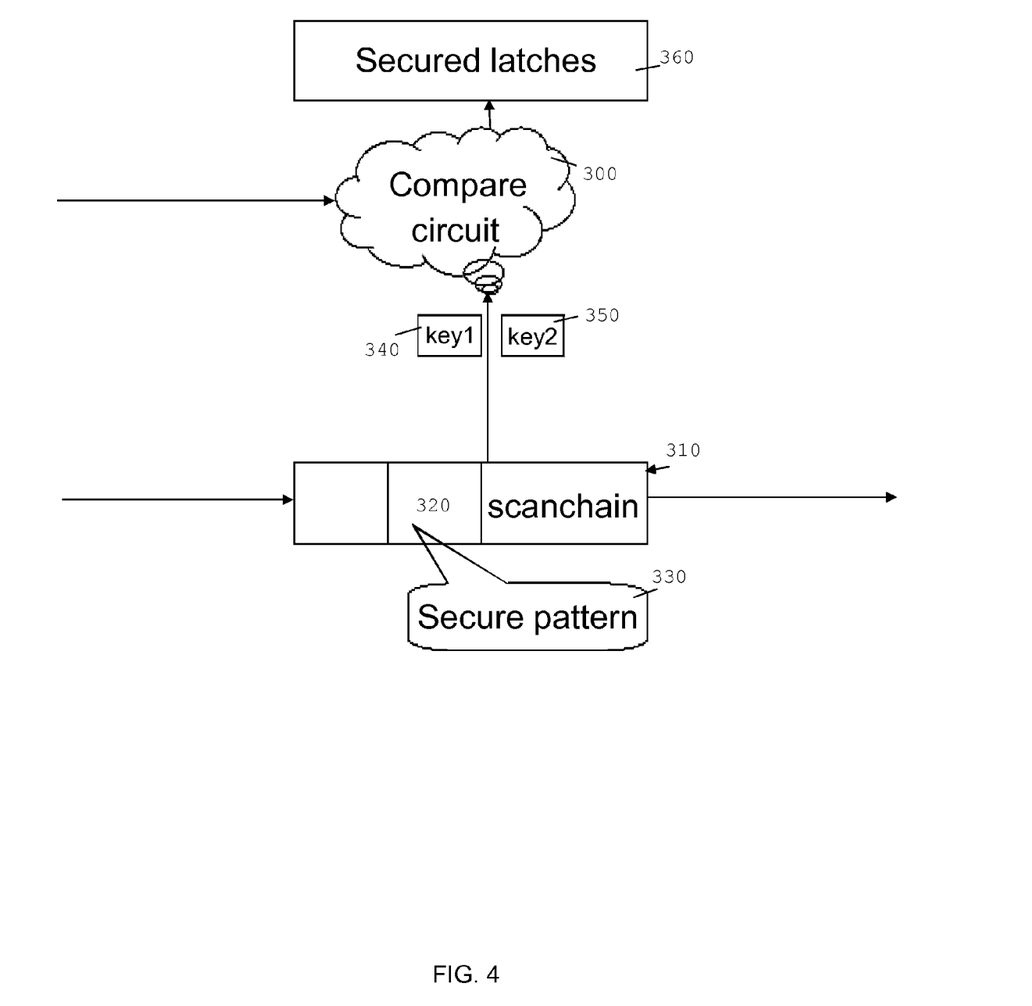

FIG. 4 illustrates a compare circuit 300. The compare circuit 300 can process a scan chain 310, which comprises an area 320 representing a secure pattern 330. The compare circuit 300 uses two different keys: a read key 340 and a write key 350. If the secure pattern 330 contains the read key 340, then the compare circuit 300 signals that read access is allowed to the secured latches 360. If the secure pattern 330 contains the write key 350, then the compare circuit 300 signals that write access to the secured latches 360 is allowed. If the secure pattern 330 does not contain the read key 340 or the write key 350, then this will have no impact to the chip behavior.

Figure 5:
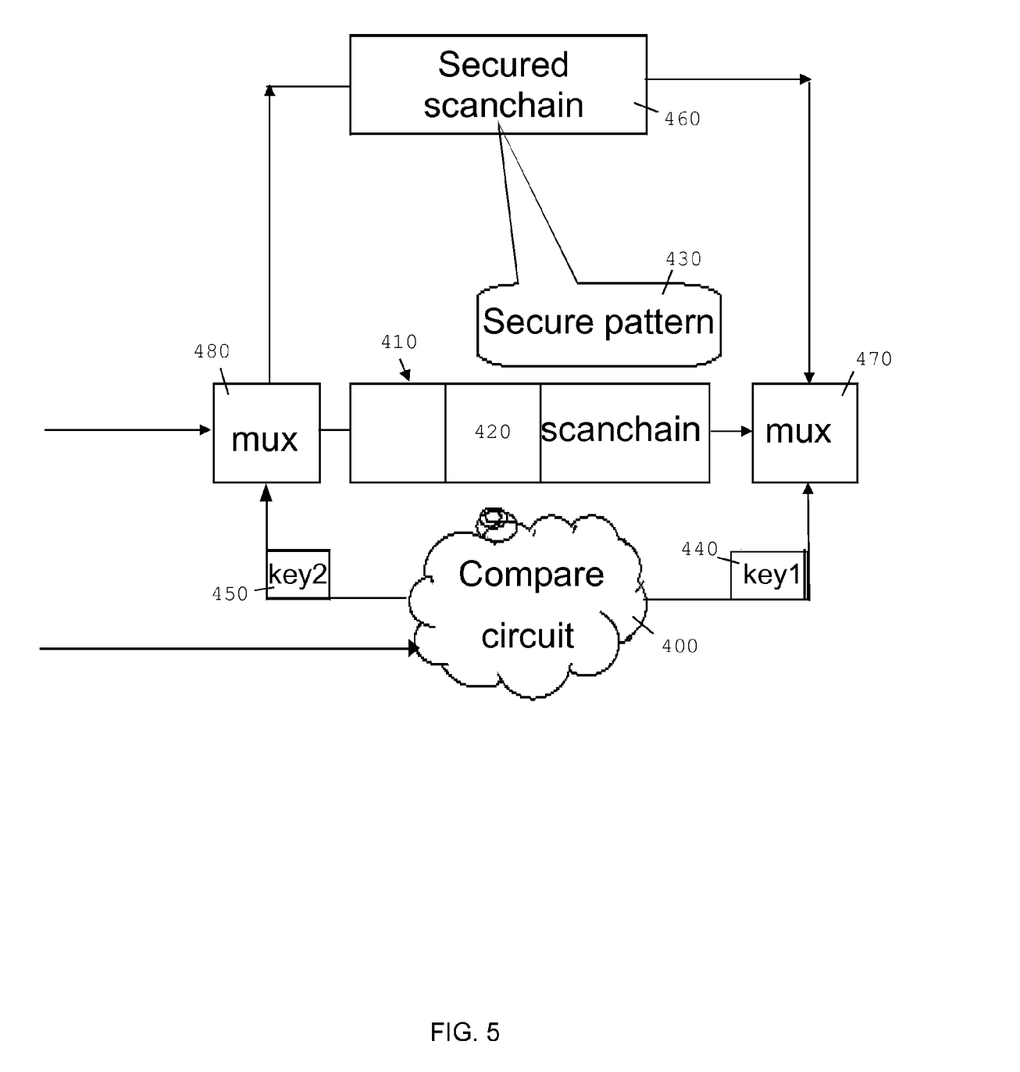

FIG. 5 illustrates a compare circuit 400. The compare circuit 400 is processing a scan chain 410, which comprises an area 420 representing a secure pattern 430. The compare circuit 400 uses two different keys: a read key 440 and a write key 450. If the secure pattern 430 contains the read key 440, then the compare circuit 400 signals to a multiplexer circuit 470 that read access is allowed to the secured latches 460. In that case the multiplexer circuit 470 allows scanning the data from the secured latches 460 in the scan chain 410. If the secure pattern 430 contains the write key 450, then the compare circuit 400 signals to a multiplexer circuit 480 that write access to the secured latches 460 is allowed. In that case the multiplexer circuit 480 allows scanning data from the scan chain 410 to the secured latches 460. If the secure pattern 430 does not contain the read key 440 or the write key 450, then this will have no impact to the chip behavior.

Figure 6:
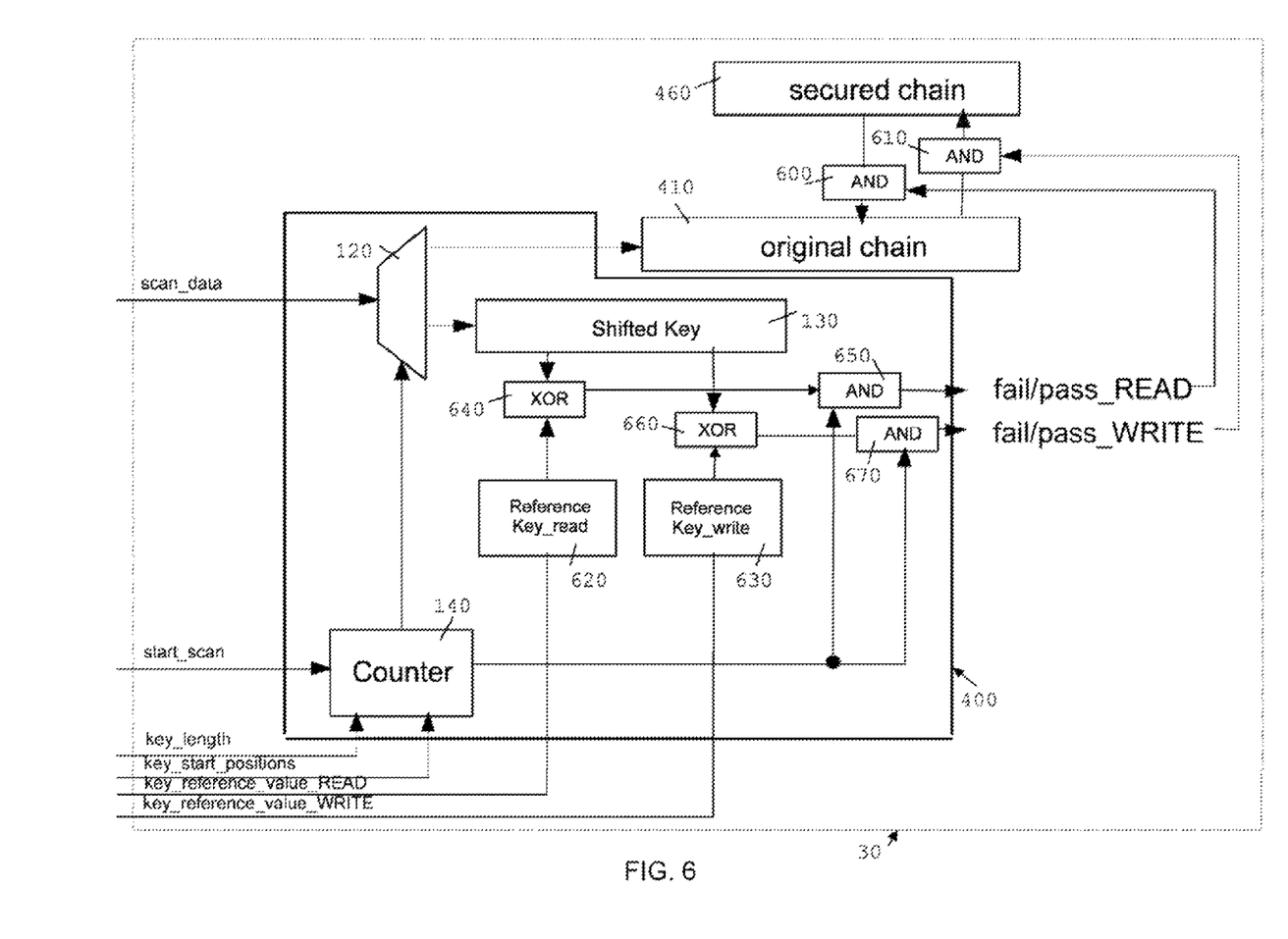

An embodiment of the compare circuit 400 is shown in FIG. 6, where it is included in an integrated circuit 30. The compare circuit 400 provides a fail/pass_READ and a fail/pass_WRITE signal instead of a single fail/pass_output signal. The fail/pass_READ signal is combined in the integrated circuit 30 with the content of the secured chain 460 via an AND gate 600. The fail/pass_WRITE signal is combined with the content of the original chain 410 via an AND gate 610. The compare circuit 400 comprises latches 620 to store the reference key_READ and latches 630 to store the reference key_write. Instead of the key_reference_value input signal, the compare circuit 400 uses two input signals: the key_reference_value_READ and the key reference value WRITE, which are connected to the latches 620 and 630 respectively. The content of the latches 620 is combined with the content of the latches 130 via an XOR gate 640. The output of the XOR gate 640 is then combined with the output of the counter circuit 140 via an AND gate 650 in order to generate the fail/pass_READ signal. Similarly, the content of the latches 630 is combined with the content of the latches 130 via an XOR gate 660. The output of the XOR gate 660 is then combined with the output of the counter circuit 140 via an AND gate 670 in order to generate the fail/pass_WRITE signal The inventive method and device can be used for scanning methods such as boundary scan as well as for scanning methods that not need dedicated controllers performing the scan operations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present inventive subject matter may be embodied as a system, method or computer program product. Accordingly, aspects of the present inventive subject matter may take the form of an entirely hardware embodiment, or embodiments can combine software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for processing a scan chain in an integrated circuit, the method comprising:
   receiving, in the integrated circuit, the scan chain, wherein the scan chain includes a secret key pattern;
   separating the secret key pattern from the scan chain;
   storing the scan chain in a first plurality of latches;
   storing the secret key pattern in a second plurality of latches;
   comparing the secret key pattern to a reference key pattern, the reference key pattern stored in a third plurality of latches;
   determining, based on the comparing the secret key pattern to the reference key pattern, that the secret key pattern does not match the reference key pattern; and
   generating a signal indicating that the secret key pattern does not match the reference key pattern.

2. The method of claim 1 further comprising:
   storing a copy of the scan chain in a secure latch;
   prohibiting access to the secure latch after generation of the signal indicating that the secret key pattern does not match the reference key pattern.

3. The method of claim 1 further comprising:
   after the generating of the signal, aborting the processing of the scan chain.

4. The method of claim 1, wherein the integrated circuit goes into a lock state after generation of the signal.

5. The method of claim 1, wherein the secret key pattern includes one or more of a read-enable key pattern, and a write-enable key pattern, and wherein the read-enable key pattern causes generation of a read-enable signal that allows reading of the scan chain, and wherein the write-enable key pattern causes generation of a write-enable signal that allows writing to the scan chain.

6. A non-transitory machine-readable storage medium including instructions, which when executed by a machine, cause the machine to perform operations for processing a scan chain in an integrated circuit, the operations comprising:
   receiving, in the integrated circuit, the scan chain, wherein the scan chain includes a secret key pattern;
   separating, via the integrated circuit, the secret key pattern from the scan chain;
   storing the scan chain in a first plurality of latches;
   storing the secret key pattern in a second plurality of latches;
   comparing, via the integrated circuit, the secret key pattern to a reference key pattern, the reference key pattern stored in a third plurality of latches;
   determining, based on the comparing the secret key pattern to the reference key pattern, that the secret key pattern does not match the reference key pattern; and
   generating, via the integrated circuit, a signal indicating that the secret key pattern does not match the reference key pattern.

7. The machine-readable storage medium of claim 6, wherein the operations further comprise:
   after the generating of the signal, aborting the processing of the scan chain.

8. The machine-readable storage medium of claim 6, wherein the integrated circuit goes into a lock state after generation of the signal.

9. The machine-readable storage medium of claim 6, wherein the secret key pattern includes one or more of a read-enable key pattern, and a write-enable key pattern, and wherein the read-enable key pattern causes generation of a read-enable signal that allows reading of the scan chain, and wherein the write-enable key pattern causes generation of a write-enable signal that allows writing to the scan chain.

10. The machine-readable storage medium of claim 6, wherein the operations further comprise:
    storing a copy of the scan chain in a secure latch;
    prohibiting access to the secure latch after generation of the signal indicating that the secret key pattern does not match the reference key pattern.

11. A method for restricting access to a scan chain in an integrated circuit, the method comprising:
    receiving, in the integrated circuit, the scan chain, wherein the scan chain includes a secret key pattern, wherein the secret key pattern includes a read key and a write key;
    storing the secret key pattern in a first plurality of latches;
    separating, by the integrated circuit, the read key and write key from the scan chain;
    storing the read key and write key in a second plurality of latches;
    comparing, by the integrated circuit, the read key to a read key reference pattern; and
    comparing, by the integrated circuit, the write key to a reference write reference key pattern.

12. The method of claim 11 further comprising:
    in response to determining that the read key matches the read key reference pattern, generating a read enable signal, wherein the read enable signal enables reading of the scan chain;

in response to determining that the write key matches the write key reference pattern, generating a write enable signal, wherein the write enable signal enables writing to the scan chain;

in response to determining that the read key does not match the read key reference pattern, generating a read disable signal, wherein the read disable signal disables reading of the scan chain; and in response to determining that the write key matches the write key reference pattern, generating a write disable signal, wherein the write disable signal disables writing to the scan chain.

13. The method of claim 11, wherein the operations further comprise:

processing of the scan chain.

14. The method of claim 11, wherein the secret key pattern includes one of 32 bits, 64 bits, and 128 bits.

15. The method of claim 11, wherein the scan chain includes information about a boundary scan of the integrated circuit.

16. A compare circuit for processing a scan chain in an integrated circuit, the compare circuit comprising:

a multiplexer configured to extract key data from the scan chain;

a comparator configured to receive the key data and to determine if the key data matches a reference key data;

a signaling component configured to generate a signal based, at least in part, on whether the key data matches a reference key data;

a memory device configured to store a copy of the scan chain, and to control access to the copy of the scan chain based, at least in part, on the signal.

17. The compare circuit of claim 16, wherein the comparator includes a read-only memory to store the reference key data.

18. The compare circuit of claim 17, wherein the read-only memory is comprised of eFUSEs.

19. The compare circuit of claim 17, wherein the comparator is further configured to detect a read-enable key in the scan chain, and wherein the signaling component is further configured to signal that the scan chain contains the read-enable key.

20. The compare circuit of claim 17, wherein the key data has a length of 32 bits, 64 bits, or 128 bits.

* * * * *